United States Patent
Kunz

[11] 3,819,450
[45] June 25, 1974

[54] APPARATUS FOR WINDING FILAMENTARY MATERIAL AROUND THE PERIPHERY OF AN UPRIGHT STRUCTURE

[76] Inventor: Bernard P. Kunz, 4981 S. Clarkson St., Englewood, Colo. 80110

[22] Filed: Oct. 26, 1971

[21] Appl. No.: 192,539

[52] U.S. Cl................ 156/425, 156/443, 156/173, 156/195
[51] Int. Cl....................... B31c 13/00, B65h 81/00
[58] Field of Search........... 156/425, 430, 443, 446, 156/172, 173, 429, 195

[56] References Cited
UNITED STATES PATENTS

| | | | |
|---|---|---|---|
| 2,808,097 | 10/1957 | Martin | 156/425 X |
| 3,492,187 | 1/1970 | Hirtzer | 156/446 X |
| 3,616,070 | 10/1971 | Lemelson | 156/446 |
| 3,652,366 | 3/1972 | Carlini | 156/443 |

*Primary Examiner*—Philip Dier
*Attorney, Agent, or Firm*—Sheridan, Ross & Fields

[57] ABSTRACT

Structure to be reinforced is preferably made up of sections of glass fiber reinforced plastic resin honeycomb paneling bonded together at their abutting edges to form an upright wall or a dome with a wall at its rim. A carriage adapted to travel repeatedly around the structure is provided with storage means for one or a plurality of strands of glass fiber roving and with a dip tank containing liquid resin. Strands move from storage means to dip tank and are impregnated by immersion or by contact with a coating roller and then pass to an applicator. In the case of multiple strands the applicator includes a comb to guide the strands in generally planar spaced relation and tilt the plane toward vertical to apply strands in a wide band to the wall. Travel of the carriage pulls the strands into place under tension, and gradually rising applicator applies strands in a spiral path. The catalyzed resin cures in situ to cohesively bond strands to wall and produce an integral structure.

4 Claims, 7 Drawing Figures

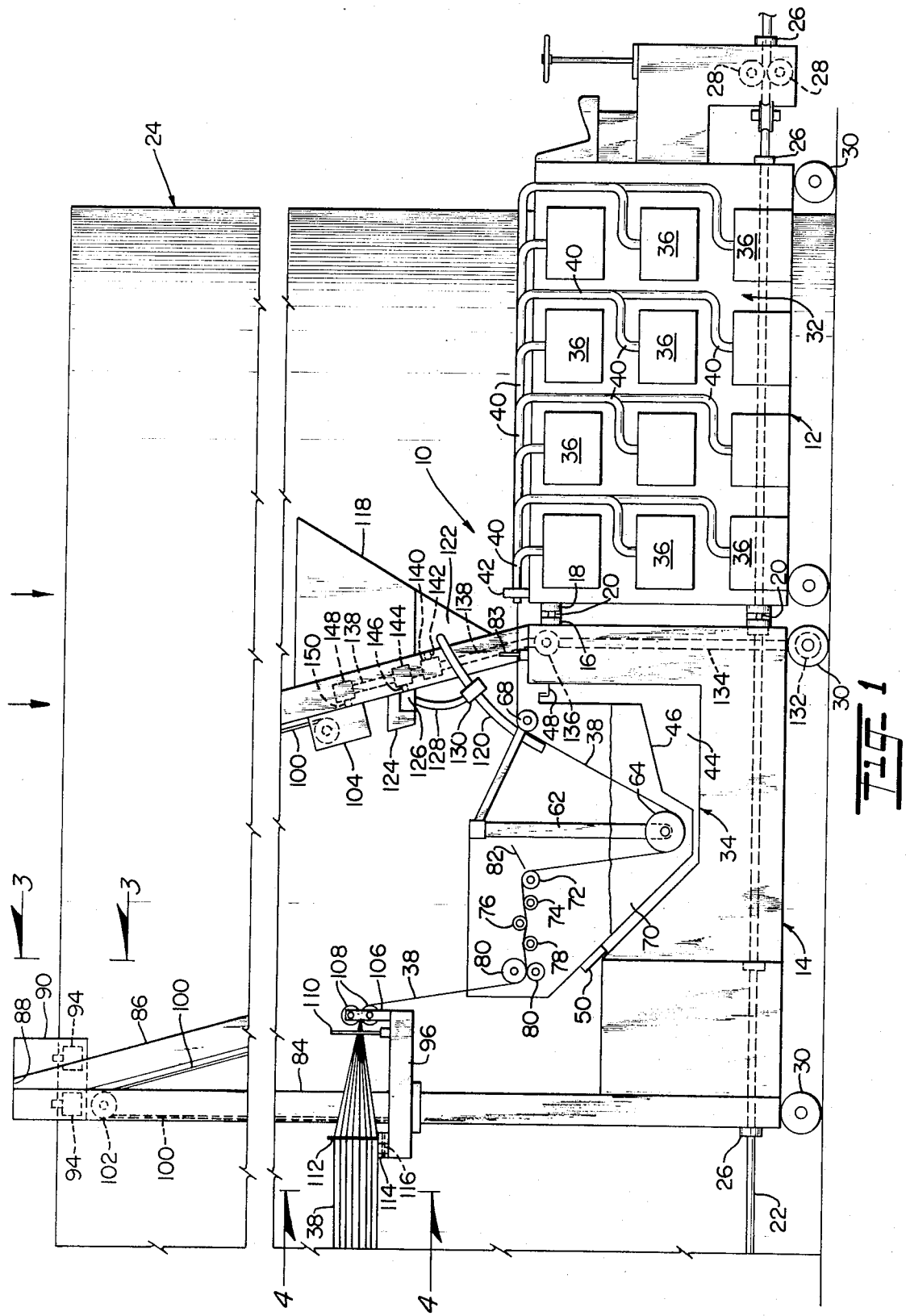

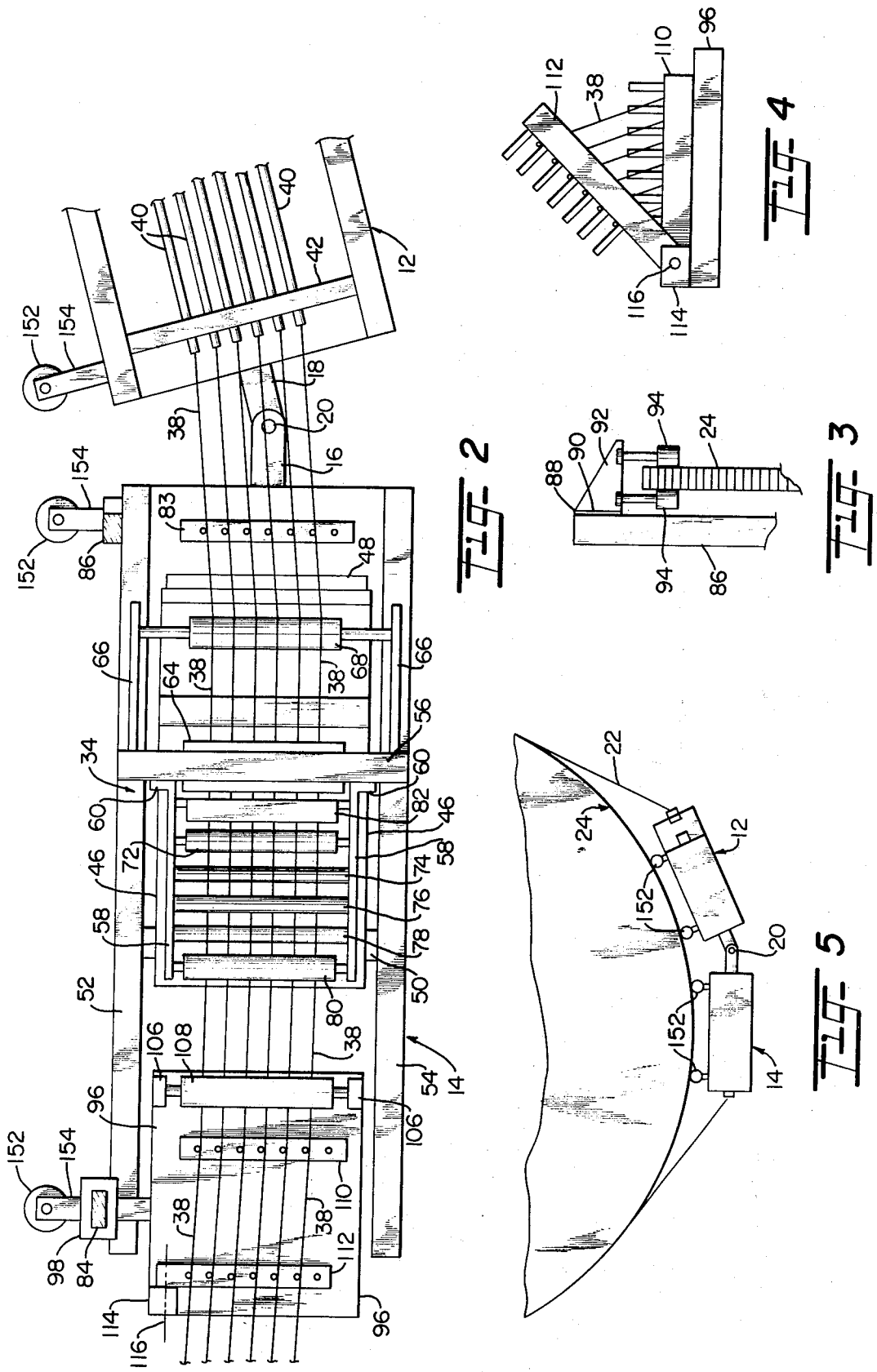

APPARATUS FOR WINDING FILAMENTARY MATERIAL AROUND THE PERIPHERY OF AN UPRIGHT STRUCTURE

BACKGROUND OF THE INVENTION

This invention lies in the field of reinforced structures and is directed primarily to large structures formed of a plurality of panels made of glass fiber reinforced plastic resin honeycomb panels bonded together at their abutting edges. It is directed particularly to providing reinforcement for such structures after they are erected, with the reinforcing means becoming an integral part of the finished product.

Honeycomb panels, consisting of a cellular core with facing skins bonded to the exposed cell edges, have been in use for many years, and various materials have been used for the cores and the skins to adapt them for various functions and environments. Recent improvements have made it highly practical to build large structures such as buildings, tanks, and domes, of honeycomb panels in which both the cores and the skins are glass fiber reinforced plastic resin. Such panels have a very high strength to weight ratio and a rigidity which is ample for the intended purposes. A tank, for instance, may be made up of a plurality of flat or curved surfaces bonded to each other along their abutting edges to form a closed, upright wall which is cylindrical or has enough flat faces to approach a cylindrical shape. A dome for such a tank may be made up of a plurality of sectors similarly bonded together. The bonding is accomplished with the same type of resin as the panels to make the structure fluid tight.

Although the components of such structures are very strong in tension, compression, and bending, the very large sizes which are used for such purposes as storing liquids are subjected to high radial forces which translate into hoop tension. This type of tension may well bring the safety factor of the jointures between panels down to an unacceptably low level.

SUMMARY OF THE INVENTION

The present invention overcomes this difficulty and provides a construction and method of achieving it which may be considered optimum because the desired strength factors are obtained with a minimum of added material and weight, and hence cost, and the apparatus for applying the desired reinforcement is relatively simple and easy to operate, and is rugged and reliable.

Generally stated, an upright structure such as a tank wall is provided with a multiplicity of wraps of reinforcing material around its exterior surface substantially from top to bottom. The reinforcing material is in the form of strands of glass fiber roving which are drawn from a storage means, coated with liquid resin of the same type as the resin material of the panels, which may be a polyester resin, and then wrapped repeatedly around the tank wall with the application of substantial tension at all times. The liquid resin cures in situ with the result that the strands are cohesively bonded to the wall and become an integral part thereof.

The apparatus for applying the reinforcement, in its presently preferred generic form, comprises a carriage which is adapted to travel repeatedly around the wall and may be supported by rollers engaging the top of the wall, but is preferably supported by rollers engaging the ground. It may be towed by a separate ground vehicle such as a tractor or by arranging a closed loop cable around the structure and using power driven gripping rollers to pull the carriage along the cable.

Storage means are provided on the carriage to hold a supply of reinforcing material which may comprise one or more packages or spools containing continuous strands of glass fiber roving. A coating station is provided adjacent to the storage means and includes a dip tank containing a supply of liquid resin and various guide means to pass the strands in contact with the resin to be coated. A coating roller may be used but the construction disclosed provides a dipping roller in the lower part of the tank, and the strands are led down into the resin, under the dipping roller and up to a riser roller above the resin level. The strands then pass between a plurality of slide bars which may be adjusted to regulate the tension in the strands and thence between a pair of exit rollers.

An applicator is provided in the form of a platform provided with pitch rollers and guide means. The strands pass between the pitch rollers and through the guide means and then are wrapped on the structure by means of the movement of the carriage. The platform is mounted for vertical movement on a guide column and is gradually moved from one level to another to trail the strands onto the wall at all levels if desired. The resin cures in situ to cohesively bond the strands integrally to the structure.

In order to apply a substantial amount of reinforcing material at each pass or circuit of the carriage, a plurality of packages or spools are provided at the storage means, and they may be a dozen or more. These multiple strands are withdrawn in laterally spaced parallel coplanar relation and continue to travel in planes extending laterally of the longitudinal axis of the vehicle to and through the coating station. The guide means on the applicator platform include a first guide comb which retains the strands in a horizontal plane and a second guide comb which is adjustable about a pivotal axis generally parallel to the longitudinal axis of the carriage to re-direct the plane of the strands toward the vertical in order to apply them on the structure in positions one above the other. Depending on the hoop tension strength required, they may be widely or closely spaced.

Means are also provided for feeding additional resin and catalyst from reservoirs to the dip tank at a rate co-ordinated with the travel of the carriage to maintain the desired level of resin in the tank as it is used up in coating. A ground driven wheel may be used to actuate pumps connected to each of the reservoirs.

BRIEF DESCRIPTION OF THE DRAWINGS

Various other advantages and features of novelty will become apparent as the description proceeds in conjunction with the accompanying drawings, in which:

FIG. 1 is a schematic view in side elevation, with parts broken away, of an apparatus for carrying out the invention;

FIG. 2 is a schematic plan view of the apparatus of FIG. 1;

FIG. 3 is a schematic view taken on line 3—3 of FIG. 1;

FIG. 4 is a schematic elevational view taken on line 4—4 of FIG. 1;

FIG. 5 is a schematic top plan view of a portion of a wall structure with the apparatus in driving relation thereto;

DESCRIPTION OF PREFERRED EMBODIMENTS

Figure 6:
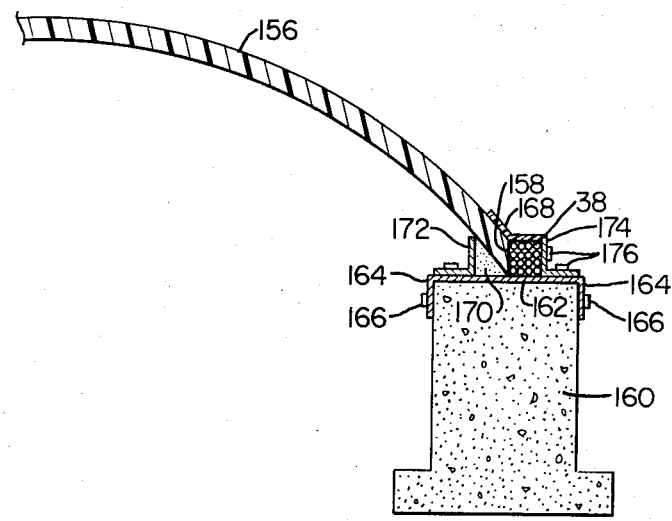
FIG. 6 is a schematic sectional view of a dome incorporating the reinforcement of the invention.

A typical apparatus incorporating the principal features of the invention is schematically illustrated in FIGS. 1 and 2, in which a carriage 10 comprises a forward section 12 and an aft section 14. While the two sections may be in the form of a single unit, they are preferably articulated for ease of handling and are connected by brackets 16 and 18 and pivot pins 20. A drive cable 22 in the form of an endless loop surrounds the structure 24 and passes longitudinally through the carriage by way of guide collars 26. A motor, not shown, drives gripping rollers 28 which pull the carriage along the cable on castors or ground rollers 30. Storage means 32 is provided on section 12 and a coating station 34 is provided on section 14.

A plurality of packages or spools 36 are mounted in storage means 32 and each package comprises a supply of a continuous strand of glass fiber roving 38. A conduit 40, preferably of plastic tubing, extends from the upper center of each package to a transverse bracket 42 at the aft end of section 12 to convey the strands to that point for travel to the coating station. At bracket 42 the conduits are in laterally spaced parallel coplanar relation extending rearwardly.

At coating station 34 a depression 44 is formed to receive dip tank 46 which is supported at its forward end by bracket 48 and at its aft end by cross bar 50 extending between side beams 52 and 54. Cross beam 56 extends across the width of the carriage and is supported by uprights, not shown, carried by the side beams. A pair of side plates 58 are connected to the cross beam by flanges 60 and extend down into the tank close to its side walls, and a pair of arms 62 extend directly down from the cross beam close to the side walls of the tank to support between them a dipping roller 64. A second pair of arms 66 extend forward from the cross beam to support entry roller 68. The lower part of the tank contains a supply of liquid resin 70 at a level sufficient to extend well above dipping roller 64.

At a level substantially above the resin, the side plates 58 support between them a riser roller 72, three slide bars 74, 76, 78, and a pair of exit rollers 80. The center slide bar is vertically adjustable by means not shown. A doctor blade 82 is also supported between the side plates just forward of riser roller 72.

When the multiple strands 38 leave conduits 40 in coplanar relation they travel rearward with respect to the carriage and pass through guide comb 83, over entry roller 68, down into the resin under dipping roller 64, out of the resin and up over riser roller 72, between slide bars 74, 76, and 78, and between exit rollers 80. As they pass over the riser roller, the doctor blade 82 removes excess resin from the roller and the strands. Since slide bar 76 is vertically adjustable and the bars are not rotatable, the total friction of the bars is varied to regulate the tension on the strands.

A vertical column 84 is attached to the aft end of beam 52 and a diagonal column 86 is attached to the forward end of the beam. The two meet at an apex 88 and are joined by a plate 90 carrying a bracket 92, from which depend a pair of rollers 94 laterally spaced to contact the inner and outer walls of structure 24 to stabilize the carriage, as seen in FIG. 3.

The applicator includes a platform 96 attached to bracket 98 which is slidably mounted on column 84 for vertical movement. It is supported by a cable 100 which is trained up over pulley 102 and down to winch 104 which is operated to increase or decrease the effective length of the cable and thus lower or raise the platform. On the forward edge of the platform, bosses 106 support pitch rollers 108. Immediately behind the rollers is a guide comb 110 which maintains the strands in spaced relation and generally in a horizontal plane. A short distance behind comb 110 is a second guide comb 112 which is mounted on a boss 114 by means of pivot pin 116. Therefore, guide comb 112 may be adjusted to any desired angle, as indicated in FIG. 4, to re-direct the plane of the strands toward the vertical and cause them to lie along the wall of structure 24 in positions one above the other, as best seen in FIG. 1, as the carriage moves forward. The tension in the strands may be regulated to any desired degree by adjustment of slide bar 76 to increase or decrease the drag. By selecting a suitable pitch of the guide comb 112, the strands may be spaced as widely or closely as desired. Two pitch rollers 108 and two exit rollers 80 are used because the platform 96 is both below and above the exit rollers at different phases of the wrapping operation.

To maintain resin 70 at the proper level in dip tank 46, a reservoir 118 is mounted on column 86 and provided with a conduit 120 to supply makeup resin to the tank. A pump 122 in the bottom of the reservoir provides and controls the supply of resin to the conduit. A second reservoir 124 contains catalyst to increase the rate of cure of the resin. A pump 126 delivers catalyst through conduit 128 to an injector 130 interposed in conduit 120 to provide mixing of the resin and the catalyst.

While the pumps may be driven by any independent means such as electric motors, it is preferred to provide a common drive which will also synchronize them to deliver catalyst and resin at a rate coordinated with the movement of the carriage to replenish resin 70 at the same rate that it is withdrawn by the coating operation. To this end, a gear box 132 is provided, connected to one of the ground rollers 30 to drive shaft 134. Gear box 136 transfers the drive to shaft 138. Gear box 140 is connected to shaft 138 to drive pump 122 through shaft 142 and gear box 144 is connected to shaft 138 to drive pump 126 through shaft 146, the gear reductions being selected to give the desired results. In the same manner, gear box 148 may be connected to shaft 138 to drive the winch 104 through shaft 150 to gradually raise or lower platform 96 as the carriage travels around the structure.

The articulation of sections 12 and 14 makes the carriage more adaptable to the curvature of the structure, as indicated in FIG. 5. The provision of wheels or rollers 152 mounted on laterally extending brackets 154 maintains the proper spacing of the carriage sections from the structure to keep cable 22 taut. The brackets may be extensible to adjust the tautness as desired.

Figure 7:
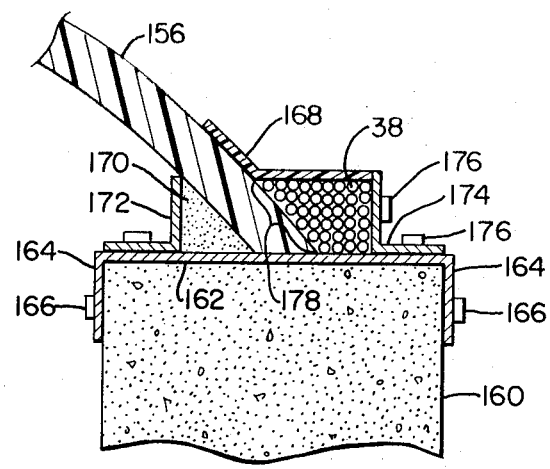
FIG. 7 is a view similar to FIG. 6 with a modified form of dome.

The same reinforcement system may be applied to the rim walls of plastic honeycomb domes as illustrated in FIGS. 6 and 7. In this case a roof or dome 156 with a cylindrical marginal wall 158 is mounted over a cylindrical abutment type wall 160. Attachment is made by an annular plate or a series of spaced plates 162 mounted on the upper margin of wall 160 and provided with depending flanges 164 secured to wall 160 by bolts or screws 166. The dome is set in place with its wall 158 located generally centrally over plate 162 and is provided with a cap or retainer strip 168 bonded to its upper surface. Strands 38 are wrapped and bonded in place in the same way as previously described except that they are also radially overlaid to fill the space under cap strip 168. Sealing mortar 170 is laid in the peripheral gap between the dome margin and plate 162. Lateral shifting may be prevented by the provision of annular flanges 172 and 174 fastened to plate 162. Vertical movement may be prevented by passing bolts 176 through flange 174 into the reinforcement.

The construction of FIG. 7 is identical to that of FIG. 6 except that the marginal wall 178 of the dome is angular. In this case the use of cap strip 168 is not only desirable but essential to insure that the strands 38 do not slide up the angular surface as they are applied with substantial tension. The construction and the net result are as above described.

What is claimed is:

1. Apparatus for winding elongate filamentary reinforcing material around the periphery of an upright structure, comprising:
   a carriage adapted to travel repeatedly around the exterior of the structure in a generally horizontal path;
   storage means on the carriage for a continuous supply of the filamentary reinforcing material;
   a tank on the carriage to hold a supply of liquid resin for coating the filamentary reinforcing material;
   an applicator on the carriage provided with first guide means to lead the filamentary reinforcing material into contact with the wall of the structure;

second guide means on the carriage to direct the travel of the filamentary reinforcing material from its supply into contact with the resin and onward to the applicator;
   the direction of movement of the carriage serving to wrap the filamentary reinforcing material in a continuous path around the structure;
   a vertically extending guide column on the carriage;

the applicator being movably mounted on the column for vertical adjustment;
   a support cable attached to the applicator;
   and a winch attached to the cable to vary its effective length;
   the winch being actuated by movement of the carriage around the structure to gradually change the elevation of the applicator.

2. Apparatus for winding elongate filamentary reinforcing material around the periphery of an upright structure, comprising:
   a carriage adapted to travel repeatedly around the exterior of the structure in a generally horizontal path;
   storage means on the carriage for a continuous supply of the filamentary reinforcing material;
   a tank on the carriage to hold a supply of liquid resin for coating the filamentary reinforcing material;
   an applicator on the carriage provided with first guide means to lead the filamentary reinforcing material into contact with the wall of the structure;

second guide means on the carriage to direct the travel of the filamentary reinforcing material from its supply into contact with the resin and onward to the applicator;
   the direction of movement of the carriage serving to wrap the filamentary reinforcing material in a continuous path around the structure;
   a continuous cable in the form of a closed loop surrounding the structure;
   and power operated drive means on the carriage engaging the cable and operative to pull the carriage along the cable around the structure.

3. Apparatus as claimed in claim 2;
   passage means extending longitudinally through the carriage;
   the cable extending through the passage means;
   and rollers extending laterally from the side of the carriage to engage the wall of the structure and maintain the tautness of the cable.

4. Apparatus for winding elongate filamentary reinforcing material around the periphery of an upright structure, comprising:
   a carriage adapted to travel repeatedly around the exterior of the structure in a generally horizontal path;
   storage means on the carriage for a continuous supply of the filamentary reinforcing material;
   a tank on the carriage to hold a supply of liquid resin for coating the filamentary reinforcing material;
   an applicator on the carriage provided with first guide means to lead the filamentary reinforcing material into contact with the wall of the structure;

second guide means on the carriage to direct the travel of the filamentary reinforcing material from its supply into contact with the resin and onward to the applicator;
   the direction of movement of the carriage serving to wrap the filamentary reinforcing material in a continuous path around the structure;
   a plurality of individual packages of reinforcing material being carried by the storage means;
   each package comprising a continuous strand of reinforcing roving;
   the second guide means being operative to conduct the strands toward the applicator in laterally spaced parallelism lying in planes extending laterally of the general longitudinal axis of the carriage;

the first guide means including a first guide member to retain the strands in a substantially horizontal plane and a second guide member angularly movable about an axis generally parallel to the longitudinal axis of the carriage to rotate the plane of the strands toward the vertical for application to the wall of the structure;
   guide conduits for conducting the strands from the packages toward the resin tank;
   first ends of the guide conduits being adjacent to the packages and the second ends being arranged in laterally spaced parallelism extending fore and aft in a generally horizontal plane;
   the second guide means including a first guide comb arranged to receive the strands from the guide conduits and retain them in spaced relation, an entry roller, a dipping roller in the lower part of the resin tank, the strands passing over the entry roller and beneath the dipping roller to be coated;

a riser roller at the upper part of the tank, friction members aft of the riser roller, and exit rollers aft of the friction members, the strands passing up over the riser roller and between the friction members and the exit rollers; and the first guide means including pitch rollers, the first guide member in the form of a second guide comb located aft of the pitch rollers, and the second guide member in the form of a third guide comb, the strands passing between the pitch rollers and through the second and third guide combs.

* * * * *